United States Patent
Zhao et al.

(10) Patent No.: US 9,063,229 B2
(45) Date of Patent: Jun. 23, 2015

(54) MIRROR USED AS MICROWAVE ANTENNA FOR MOTION SENSOR

(75) Inventors: Jie Zhao, Futian District (CN); Teng Zhang, Nanshan District (CN); Tianfeng Zhao, Nanshan District (CN); Lei Qin, LongGang District (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 443 days.

(21) Appl. No.: 13/603,782

(22) Filed: Sep. 5, 2012

(65) Prior Publication Data

US 2014/0062810 A1    Mar. 6, 2014

(51) Int. Cl.
| | |
|---|---|
| G08B 13/00 | (2006.01) |
| G01S 13/56 | (2006.01) |
| G01S 17/02 | (2006.01) |
| H01Q 9/20 | (2006.01) |
| H01Q 19/10 | (2006.01) |
| B82Y 20/00 | (2011.01) |

(52) U.S. Cl.
CPC ............. *G01S 13/56* (2013.01); *G02F 2202/36* (2013.01); *B82Y 20/00* (2013.01); *G01S 17/023* (2013.01); *G01S 17/026* (2013.01); *H01Q 9/20* (2013.01); *H01Q 19/10* (2013.01)

(58) Field of Classification Search
CPC ..... B82Y 20/00; B82Y 35/00; G02F 2202/36
USPC ............... 340/541, 545.3, 545.1; 343/840; 250/338.3
See application file for complete search history.

(56) References Cited

U.S. PATENT DOCUMENTS

| | | | | |
|---|---|---|---|---|
| 5,105,084 | A | * | 4/1992 | Nagai et al. ................ 250/338.3 |
| 5,517,196 | A | * | 5/1996 | Pakett et al. ..................... 342/70 |
| 2002/0044054 | A1 | * | 4/2002 | Krubiner et al. ........... 340/545.3 |
| 2006/0145842 | A1 | * | 7/2006 | Stilp ....................... 340/539.22 |
| 2008/0087824 | A1 | * | 4/2008 | Hayashi et al. ............ 250/338.1 |
| 2008/0157964 | A1 | * | 7/2008 | Eskildsen et al. .......... 340/545.1 |
| 2012/0116861 | A1 | * | 5/2012 | Dobyns ...................... 705/14.34 |
| 2012/0326939 | A1 | * | 12/2012 | Cannon et al. ................ 343/840 |

\* cited by examiner

*Primary Examiner* — Shirley Lu
(74) *Attorney, Agent, or Firm* — Husch Blackwell LLP

(57) ABSTRACT

Apparatus is provided including a microwave transceiver, a microwave antenna coupled to the microwave transmitter that transmits microwave energy into a secured area and receives reflected microwave signals from the secured area, a passive infrared detector that receives infrared energy from the secured area and a reflector having a focal point, the reflector reflects both microwave and infrared radiation received from the secured area onto the focal point, the microwave antenna and passive infrared detectors both located proximate the focal point of the reflector.

20 Claims, 4 Drawing Sheets

MIRROR USED AS MICROWAVE ANTENNA FOR MOTION SENSOR

FIELD

The field of the invention relates to security systems and more particularly to motion sensors used in security systems.

BACKGROUND

Passive infrared (PIR) sensors or passive infrared detectors (PIDs) are generally known. Such devices find ready use as intrusion detectors in security systems.

A PID device detects intrusion via the infrared radiation emitted by humans. However, PID devices suffer from the difficulty of not being able to differentiate between humans and animals and in not being able to detect humans against hot background surfaces.

One particular type of PID devices is a PID motion detector. A PID motion detector uses a pair of infrared detectors arranged to scan adjacent areas. In this regard, the pair of detectors may be connected in series so that when both areas have the same background temperature, the signal from the one will cancel the signal from the other.

PID motion detectors have been found to be considerably more reliable than when PID devices are used individually and especially when combined and used with a microwave motion detector. Since the PIDs are connected to cancel one another, PID motion detectors are less vulnerable to transients, e.g., flashes of light (e.g., lightning) detected by the pair of detectors. When combined with a microwave transceiver the two devices can be logically ANDed to provide an even more reliable device.

While a combined PID motion detector and microwave motion detector is a significant improvement, it is bulky and expensive. Accordingly, a need exists for improved motion detection devices.

DETAILED DESCRIPTION OF AN ILLUSTRATED EMBODIMENT

Figure 1:
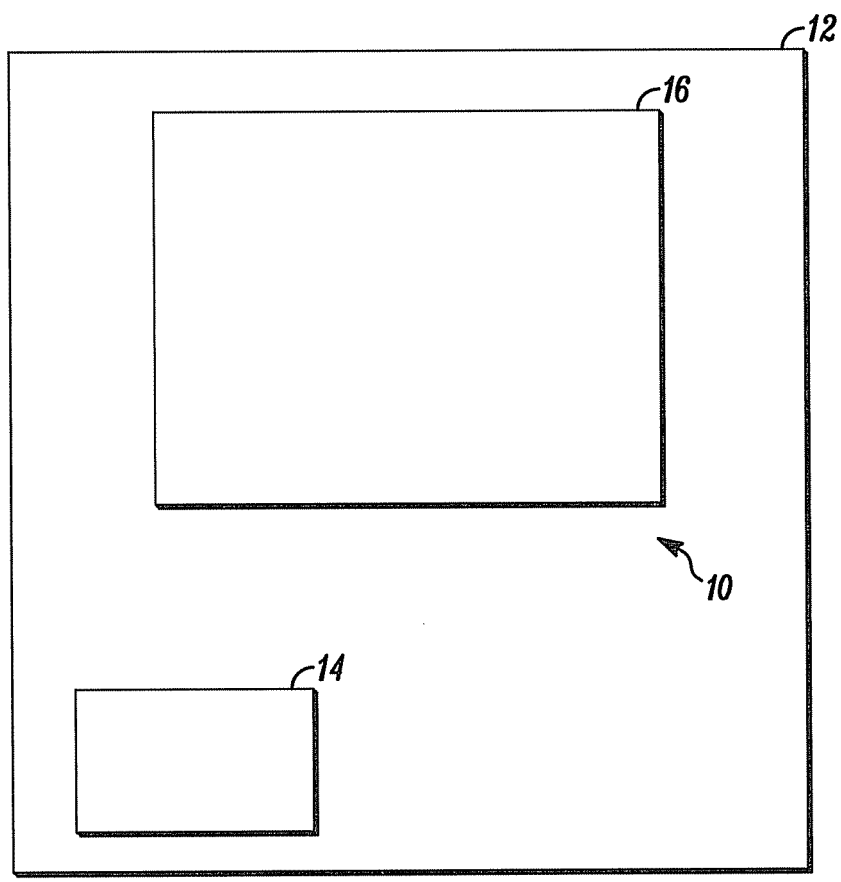
FIG. 1 depicts a motion sensor shown in a context of use under an illustrated embodiment.

FIG. 1 is a simplified block diagram of a motion detection device 10 shown in a context of use generally in accordance with an illustrated embodiment. In this regard, the motion detection device 10 may be installed within a secured area 12 and electrically connected to a control panel 14 of a security system for the area 12.

In use, the motion detection device 10 may monitor a portion of the secured area 12 for intruders. Upon detecting an intruder, the motion detection device 10 may send an intruder alert to the control panel 14. The control panel 14 may respond by activating a local audible alarm and/or by notifying a local police department.

Figure 2:
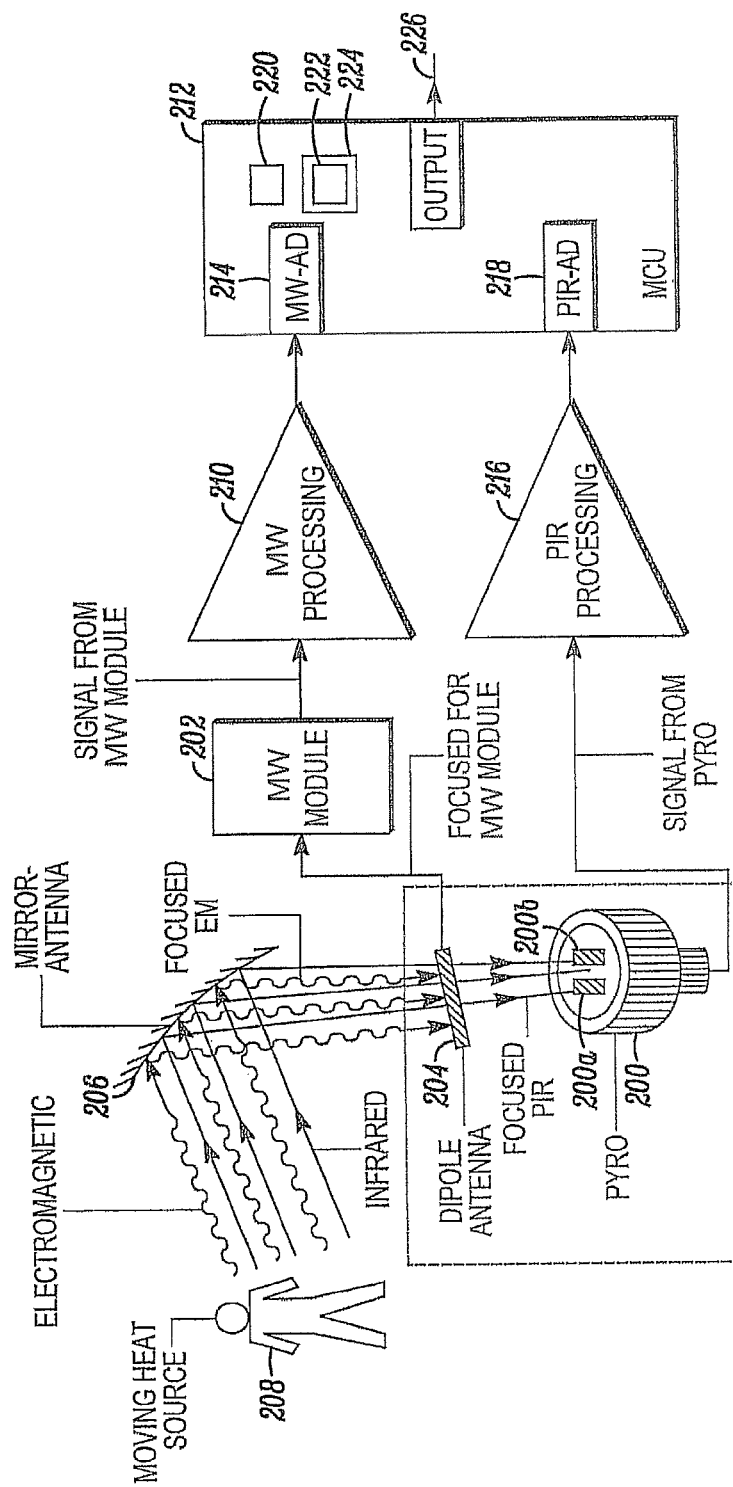
FIG. 2 depicts a block diagram of the motion sensor of FIG. 1.

FIG. 2 is a block diagram of the motion detector 10. Included within the motion detector 10 is a pyroelectric detector 200 and a microwave module 202 that receive signals originating from intruders within the secured area 12. In this regard, the microwave module 202 transmits and receives (transceives) a microwave signal into a portion of the secured area 12 via an antenna 204 and reflector 206 that also operates as a lens because it focuses energy into a focal point. The transmitted microwave signal may be continuous wave (CW) or pulsed (PW).

Objects within the secured area (e.g., a person) 208 reflect a portion of the transmitted microwave signal back to the microwave module 202 through the reflector 206 and antenna 204. If the person 208 is moving, then the reflected signal with have a Doppler phase (or frequency shift) that is proportional to the speed, the size and the direction of movement of the moving person.

The microwave module 202 and a signal processing module 210 are hardware devices that are constructed to receive the reflected signal and recover the Doppler signal by filtering the signal and downshifting the signal to baseband. In this case, the processing module 210 may include one or more mixers and filtering sections that operate to mix the reflected signal with a portion of the transmitted signal to reduce the Doppler signal to baseband. Once at baseband, the Doppler signal is sampled by a microwave analog to digital (ND) converter 214 at an appropriate sampling rate (e.g., 3 kHz) for processing within another appropriate hardware device (e.g., a microprocessor) 212.

Similarly, the pyro device 200 includes two side-by-side infrared detectors 200a, 200b that receive infrared energy from the portion of the secured area 12 via the reflector 206. It should be noted in this regard that the detectors 200a, 200b together receive infrared energy from the portion of the secured area 12 that is substantially coincident with the area that reflects microwave from the microwave module 202.

In this regard, the pair of detectors 200a, 200b and the optics of the reflector 206 are designed so that the pair of detectors 200a, 200b receive infrared energy from directly adjacent subparts of the portion covered by the microwave module 202.

The infrared signals from the pair of detectors 200a, 200b may be filtered and amplified within a PIR processing device 216 and provided as an input to an analog to digital (ND) converter 218. Within the processing device 212, the infrared signals from the respective infrared detectors 200a, 200b may be processed separately to confirm the presence of an intruder.

In general, the reflector 206 is comprised of a number of reflector elements. Each lens element "casts" a positive and negative finger pair into the secured area 12. Each finger of the finger pair of each lens of the reflector receives energy from a small area of the secured area 12 and delivers that energy on one of the two infrared detectors 200a, 200b.

The infrared detectors 200a, 200b may be connected in an anti-phase relationship (i.e., the positive pole of one device 200a is connected to the positive pole of the other device 200b or vice versa). This causes common signals detected by both devices 200a, 200b to be canceled. The net result is that when the person 208 passes in front on one device 200a of the pair of devices 200a, 200b, the output of the pyro device 200 will respond with a signal excursion of a first polarity, but when the person 208 walks further so that they are in front of the second device 200b, the excursion will reverse. The direction of the signal excursion from the pyro device 200 provides a direct indication of the direction that the person 208 was walking when he/she passes in front of the device 200.

The signal from the pyro device 200 is processed within a first hardware device 216 and provided as an input to a PIR analog to digital (ND) converter 218. The signal is sampled at an appropriate sampling rate (e.g., 3 kHz) for processing within the processing device 212.

In the regard, one or more signal processors 220 operating under control of software 222 loaded from a non-transitory computer readable medium (memory) 224 may process the signals. For example, a microwave signal processor 220 may compare a level of the Doppler signal with a threshold value to confirm the actual presence of an intruder.

Similarly, one or more infrared signal processors 220 may process the signal from the pyro device 200 to confirm the presence of the intruder. In a first step, the processor 220 may compare the signal with a threshold value to confirm that the presence of the intruder. Similarly, the same or a different direction processor 220 may determine the direction of the signal transition to determine the direction of the intruder passing in front of the detectors 200a, 200b.

In addition, a confirmation processor 220 within the device 212 may logically AND the microwave and infrared signals before an output is transferred through an output 226 to the control panel 14. In addition, one or more encoding processors 220 may be provided that operate to encode the output signal with source information that identifies the motion detector 10 to the control panel 14.

Figure 3:
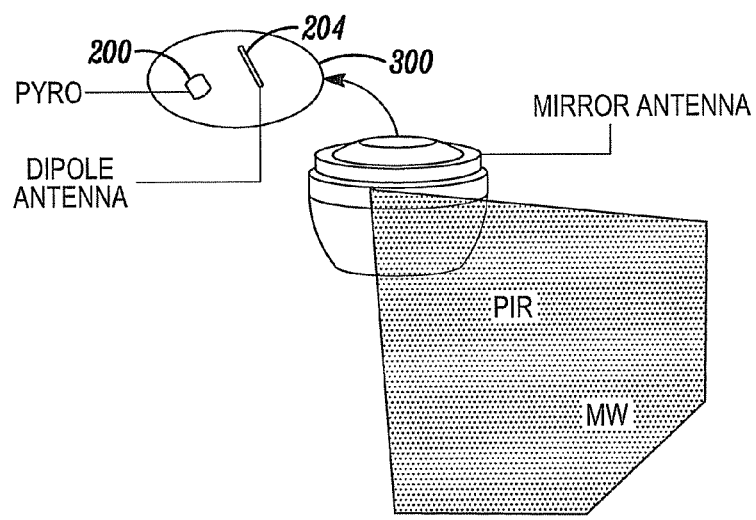
FIG. 3 depicts details of the reflector of FIG. 2.

FIG. 3 depicts further details of the reflector 206 and a detector assembly 300. In this case, the detector assembly 300 may include the pyro device 200 and antenna 204.

Under one preferred embodiment, the detector assembly 300 is mounted on the reflector 206 as shown in FIG. 3. In this regard, the pyro device 200 and antenna 204 are both located at a focal point of the reflector where the infrared energy and microwave energy is concentrated via operation of the reflector.

Under some embodiments, the pyro device 200 and antenna 204 are disposed directly adjacent one another. This is possible because the index of refraction of infrared energy and microwave energy is slightly different thereby allowing the antenna 204 and device 200 to be placed directly adjacent one another while both still remain substantially within the focal point of the reflector 206, as shown in FIG. 3.

Figure 4:
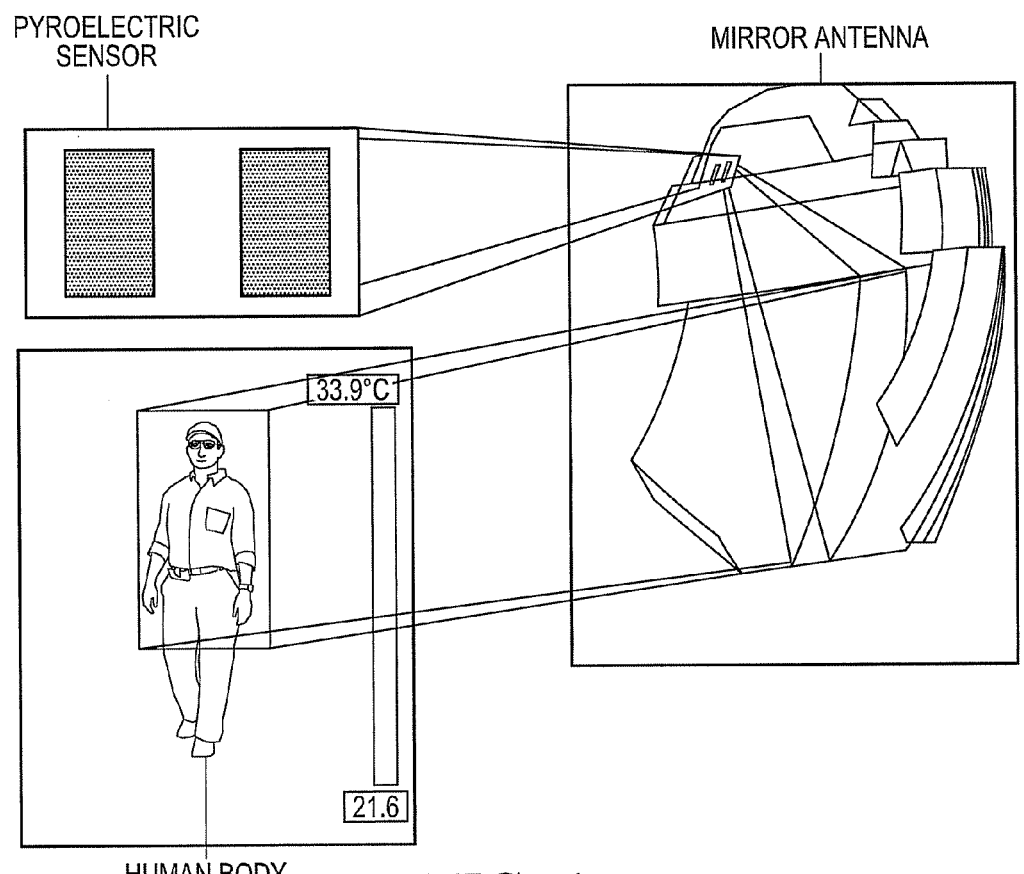
FIG. 4 depicts signal propagation of the reflector of FIG. 2.

FIG. 4 depicts another example of the reflector 206. It should be specifically noted in this case, that the segmented nature of the reflector 206 allows two separate images to be formed on the two different infrared detectors 200a, 200b.

In one preferred embodiment, the reflector 206 may be created by selecting a reflector that was previously useable with the pyro device 200 alone and coating the reflector with a conductive metal. The coating of the reflective metal (and possibly some polishing of the coating) allows the reflector to also reflect microwave energy onto a focal point determined by a frequency of the microwaves.

In this regard, the reflector 206 has a common reflective surface that receives microwave and infrared energy from the secured area and focuses that microwave and infrared energy from the common reflective surface onto the antenna 204 and infrared detectors 200a, 200b. Similarly, the reflector 206 receives microwave energy from the antenna 204 and focuses that microwave energy into the secured area.

Figure 5:
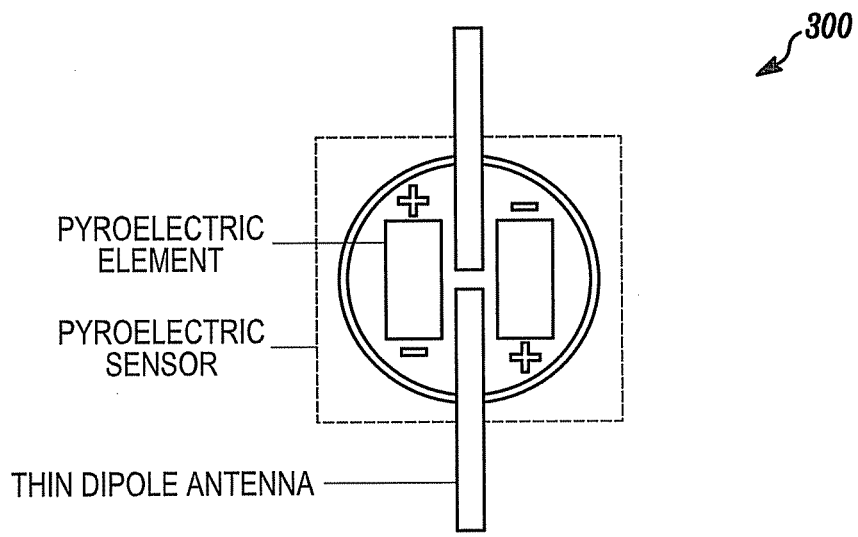
FIG. 5 depicts a detector assembly of FIG. 2 with the antenna parallel to the infrared detectors.
Figure 6:
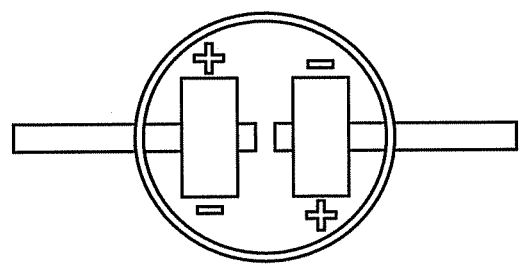
FIG. 6 depicts a detector assembly of FIG. 2 with the antenna perpendicular to the infrared detectors.
Figure 7:
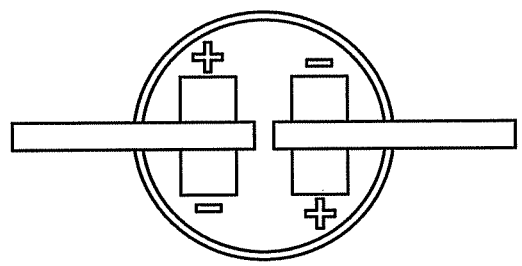
FIG. 7 depicts an alternate detector assembly of FIG. 2 with the antenna perpendicular to the infrared detectors.

FIGS. 5-7 depict additional examples of the detector assembly 300. As shown in FIG. 5, the antenna 204 is a dipole and is coincident with the pyro device 200. In this case, the antenna 204 is located parallel to and between the two infrared detectors 200a, 200b. This particular configuration causes the least inference between the functionality of the antenna 204 and infrared detectors 200a, 200b and is useful in minimizing the space required by the detector assembly 300.

As shown in FIGS. 6 and 7, the antenna 204 positioned perpendicular to the longitudinal axis of the infrared detectors 200a, 200b. In FIG. 6, the antenna 204 is located beneath the infrared detectors 200a, 200b. In this case, the partial shadowing of the antenna 204 by the infrared detectors 200a, 200b may be compensated with a longer antenna 204. This may be useful where the reflector is particularly well focused along the axis of the antenna 204.

In FIG. 7, the antenna 204 is placed over the infrared detectors 200a, 200b. In this case, the partial shadowing of the infrared detectors 200a, 200b is minimized by the greater diffraction of infrared energy, a relatively thin antenna 204 and an increased area of the infrared detectors 200a, 200b.

In general, the motion detection device 10 includes a microwave transceiver, a microwave antenna coupled to the microwave transmitter that transmits microwave energy into a secured area and receives reflected microwave signals from the secured area, a passive infrared detector that receives infrared energy from the secured area and a reflector having a focal point, the reflector reflects both microwave and infrared radiation received from the secured area onto the focal point, the microwave antenna and passive infrared detectors both located proximate the focal point of the reflector.

In another embodiment, the motion detection device includes a housing, a microwave transceiver, an antenna that transmits microwave energy from the microwave transceiver into a secured area and receives reflected energy from the secured area, a pyroelectric device that receives infrared energy from the secured area, a reflector supported by the housing that receives reflected microwave energy and infrared energy from the secured space on a common reflective surface and focuses the microwave energy and infrared energy from the common reflective surface onto the antenna and pyroelectric device.

In still another embodiment, the motion detector includes a housing disposed within a secure area, a microwave transceiver, an antenna that transmits microwave energy from the microwave transceiver into a portion of the secured area and receives reflected energy from the portion of the secured area, first and second infrared detectors that receives infrared energy from the directly adjacent halves of the portion of the secured area, a reflector supported by the housing that, in turn, supports the antenna and first and second infrared detectors, the reflector receives microwave energy from the antenna on a common reflective surface and transmits the microwave energy into the portion of the secured area, the reflector also receives reflected microwave energy and infrared energy from the portion of the secured area on the common reflective surface and focuses the microwave energy and infrared energy from the common reflective surface onto the antenna and first and second infrared detectors and a processor that provides an intruder detected signal through an output to a security system of the secured area in response to a signal indicating detection of the intruder from the microwave transceiver and first and from the second infrared detectors Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. Apparatus comprising:
   a microwave transceiver;
   a microwave antenna coupled to the microwave transceiver that transmits microwave energy into a secured area and receives reflected microwave signals from the secured area; and
   a passive infrared detector that receives infrared energy from the secured area; and
   a reflector having a focal point, the reflector reflects both microwave and infrared radiation received from the secured area onto the focal point, the microwave antenna and passive infrared detector both located proximate the focal point of the reflector.

2. The apparatus as in claim 1 wherein the microwave antenna further comprises one of a dipole antenna, a patch antenna.

3. The apparatus as in claim 1 further comprising a mixer that detects a Doppler frequency by mixing a transmitted microwave signal with a reflected signal received through the antenna.

4. The apparatus as in claim 3 further comprising an intrusion processor that detects the Doppler frequency or amplitude and compares the Doppler frequency or amplitude with a frequency or amplitude threshold to detect an intruder.

5. The apparatus as in claim 4 wherein the passive infrared detector further comprises a pair of infrared detectors connected in series with a pole of the same polarity connected together to cancel commonly detected infrared energy.

6. The apparatus as in claim 5 further comprising a direction processor that determines a direction of travel of an intruder across a field of view of the passive infrared detector based upon a direction of a polarity change of an output of the series connected infrared detectors.

7. The apparatus as in claim 5 further comprising a processor that logically ANDs the detection of the intruder from the intrusion processor and the direction processor and provides an intruder detected signal on an output to a control panel of a security system of the secured area.

8. An apparatus comprising:
   a housing;
   a microwave transceiver;
   an antenna that transmits microwave energy from the microwave transceiver into a secured area and receives reflected microwave energy from the secured area;
   a pyroelectric device that receives infrared energy from the secured area; and
   a reflector supported by the housing that receives reflected microwave energy and infrared energy from the secured space on a common reflective surface and focuses the microwave energy and infrared energy from the common reflective surface onto the antenna and pyroelectric device.

9. The apparatus as in claim 8 wherein the pyroelectric device further comprises a pair of elongated infrared detectors mounted on the pyroelectric device in a mutually parallel arrangement.

10. The apparatus as in claim 9 wherein the antenna and pyroelectric device further comprises a detector assembly supported by the reflector.

11. The apparatus as in claim 10 wherein the detector assembly further comprises the antenna disposed between the pair of elongated infrared detectors parallel to each.

12. The apparatus as in claim 11 wherein the detector assembly further comprises the antenna disposed perpendicular to the pair of elongated infrared detectors and extending across a center of each of the pair of infrared detectors.

13. The apparatus as in claim 12 further comprising the antenna disposed over the pair of infrared detectors.

14. The apparatus as in claim 13 further comprising the antenna disposed beneath the pair of infrared detectors.

15. An apparatus comprising:
   a housing disposed within a secure area;
   a microwave transceiver;
   an antenna that transmits microwave energy from the microwave transceiver into a portion of the secured area and receives reflected energy from the portion of the secured area;
   first and second infrared detectors that receives infrared energy from the directly adjacent halves of the portion of the secured area;
   a reflector supported by the housing that, in turn, supports the antenna and first and second infrared detectors, the lens receives microwave energy from the antenna on a common reflective surface and transmits the microwave energy into the portion of the secured area, the reflector also receives reflected microwave energy and infrared energy from the portion of the secured area on the common reflective surface and focuses the microwave energy and infrared energy from the common reflective surface onto the antenna and first and second infrared detectors; and
   a processor that provides an intruder detected signal through an output to a security system of the secured area in response to a signal indicating detection of the intruder from the microwave transceiver and from the first and second infrared detectors.

16. The apparatus as in claim 15 wherein the first and second infrared detectors are connected in series in an antiphase relationship to cancel commonly detected signals across the first and second infrared detectors.

17. The apparatus as in claim 15 further comprising the antenna disposed between the first and second infrared detectors parallel to each.

18. The apparatus as in claim 15 further comprising the antenna disposed perpendicular to the first and second infrared detectors and extending across a center of each of the infrared detectors.

19. The apparatus as in claim 18 further comprising the antenna disposed over the first and second infrared detectors.

20. The apparatus as in claim 18 further comprising the antenna disposed beneath the pair of infrared detectors.

* * * * *